UNITED STATES PATENT OFFICE.

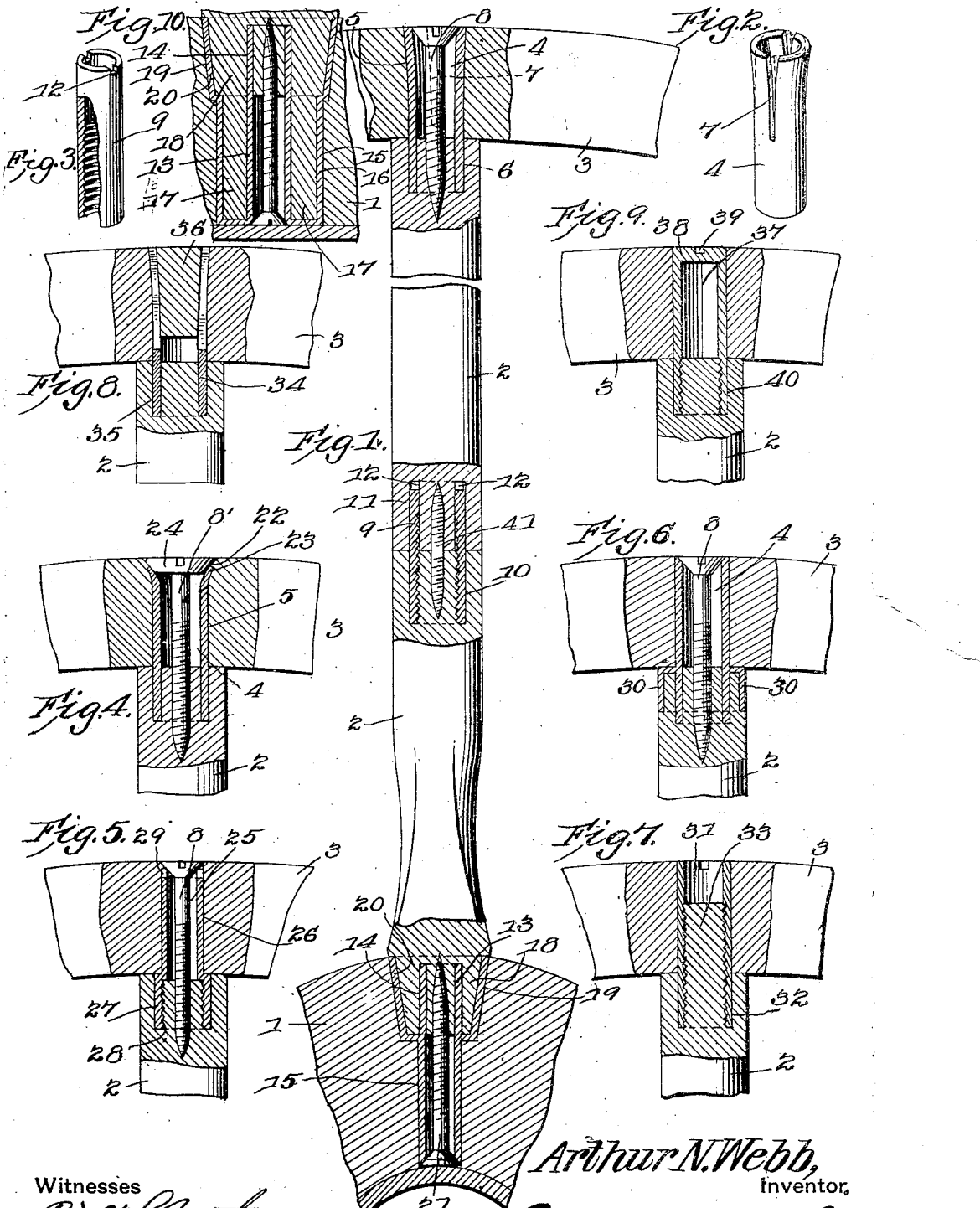

ARTHUR N. WEBB, OF YOUNGSVILLE, PENNSYLVANIA.

VEHICLE-WHEEL.

No. 835,124.

Specification of Letters Patent.

Patented Nov. 6, 190

Application filed October 4, 1905. Serial No. 281,321.

*To all whom it may concern:*

Be it known that I, ARTHUR N. WEBB, a citizen of the United States, residing at Youngsville, in the county of Warren and State of Pennsylvania, have invented a new and useful Vehicle-Wheel, of which the following is a specification.

This invention relates to vehicle-wheels, and has for its object to provide an improved form of coupling or connection which is capable of being used between the spoke and the rim, between the spoke and the hub, and to splice a broken spoke. It is furthermore designed to effect the convenient application of the present joint or connection and to construct the same so as to be strong and durable without making any material change in the conventional forms of the wheel elements.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the accompanying drawings, Figure 1 is a fragmentary view of a spoke and portions of a hub and rim which are broken away to disclose the coupling or connection of the present invention. Fig. 2 is a detail perspective view of the tubular coupling element employed in Fig. 1 between the spoke and the rim. Fig. 3 is a detail perspective view of the form of tubular coupling element employed between the spoke-sections. Figs. 4, 5, 6, 7, 8, and 9 are detail sectional views of various modifications of the invention. Fig. 10 is a sectional view showing a modified means of securing the spoke in the hub.

Like characters of reference designate corresponding parts in each and every figure of the drawings.

Referring at first more particularly to Fig. 1 of the drawings, wherein has been shown a portion 1 of a hub, a spoke 2, and a portion 3 of a rim, it will be seen that the coupling or connection between the spoke and the rim includes an open-ended metallic tubular element 4, which is passed inwardly through a radial opening 5, formed through the rim. The outer end of the tube 4 is flush with the outer face of the rim, and the length of the tube exceeds the thickness of the rim, so as to have its inner end entered into an annular seat or socket 6, formed in the outer end of the spoke.

As shown in Fig. 2, it will be noted that the outer end portion of the tube 4 is split or cleft longitudinally, with its split portion spread prior to being driven through the opening in the rim, whereby the tube is snugly wedged in the rim when driven therethrough. In addition to the tube 4 there is a headed threaded fastening 8, which is passed into the open outer end of the tube and screwed into the outer end of the spoke until the head of the fastening engages the outer end of the tube and closes the same. By preference the head of the screw is beveled, so as to fit flush with the outer surface of the rim.

A similar form of connection may be employed to splice a broken spoke, as indicated in Fig. 1 of the drawings, wherein the metallic tube 9, corresponding to the tube 4 and shown in detail in Fig. 3, has one end portion internally threaded and screwed into the annular seat or socket 10, provided in the outer end of the inner portion of the spoke, the other portion of the tube being received within an annular socket 11, formed in the inner end of the outer portion of the spoke. The outer end of the tube is provided with diametrically opposite notches 12, forming a screw-driver seat for convenience in screwing the tube into the socket 10. While it is possible to have the socket 11 threaded, it is preferred to have the same smooth in order that the outer portion of the spoke may be readily slipped upon the projecting portion of the tube. By this manner of connecting the spoke-sections the appearance of the spoke is not changed nor is it weakened by the formation of transversely-disposed openings.

The connection between the inner end of the spoke and the hub consists of an open-ended metallic tube 13, fitting in an annular socket 14 in the inner end of the spoke and an opening 15 in the hub. The tube 13 is embraced by a cap 16, which produces chambers at opposite sides of the tube for the reception of projections 17, formed upon the tenon portion 18 of the spoke, which fits within an enlargement 19 of the opening 15. The case 16 is flared, as at 20, to form a cap snugly embracing the tenon portion 18 of the spoke. A headed screw 21 is passed through the tube 13 and into the inner end of the spoke, with the head of the screw received flush within the end of the tube.

A slight modification of the form of coupling or connection between the spoke and the rim has been shown in Fig. 4 of the drawings, where the tube 4 has its outer end flared, as at 22, with the opening 5 in the rim counterbored, as at 23, to receive this flared portion. The screw 8' is provided with a head 24, which is somewhat larger than the head of the screw 8, so as to bear against the flared portion of the tube and lie flush within the outer face of the rim.

In Fig. 5 the tube 25 is smaller in diameter than those hereinbefore described in order that a correspondingly-smaller opening 26 may be formed through the rim, the inner end of the tube being provided with an enlarged cylindrical flange or cup 27, which is internally threaded and fits into a threaded annular seat or socket 28, formed in the spoke, the outer end of the tube being provided with notches 29 for the reception of a screw-driver. The same form of threaded fastening 8 is employed in this embodiment of the invention as in that shown in Fig. 1.

The modification shown in Fig. 6 includes the same elements as in Fig. 1 with the addition of a cylindrical cap 30, carried intermediately by the tube 4 and embracing the outer end of the spoke, so as to incase the same and prevent splitting thereof.

In each of the forms shown in Figs. 5 and 6 it will be noted that there is an annular shoulder provided upon the tube and bearing against the inner face of the rim as an additional guard to prevent outward working of the tube.

As embodied in Fig. 7 the screw is omitted and the tube 31 is internally threaded and fitted in the socket 32 in the spoke, from which an integral pin or tenon 33 extends a suitable distance into the tube portion, which lies within the rim, so as to form a brace for the tube.

The arrangement shown in Fig. 8 includes a split tube 34, similar to that shown in Fig. 2, with its inner end portion fitted in an annular socket 35 in the spoke and its slotted portion wedged in the opening in the rim, there being a plug 36 driven into the outer end portion of the tube, so as to wedge the same firmly in the rim.

As illustrated in Fig. 9, the tube 37 is closed at its outer end by a head 38, having a screw-driver seat 39 for working the tube into the threaded socket 40, formed in the outer end of the spoke.

From the foregoing disclosure of the present invention it will be noted that all of the connecting parts of the present invention are housed and protected within the two connected members, wherefore the appearance of the joint is not changed nor is any material alteration required in said members. Moreover, the connection between the wooden members is made up of metallic parts, so as to secure a strong and durable connection.

While the present invention may be used in the original construction of wheels, it is also capable of being employed for repairing old wheels, particularly where the rim-engaging spoke-tenon has become broken. The invention is also capable of being used for connecting broken spokes and also for connecting spokes to the hub of the wheel as well as to the rim thereof.

It is proposed to strengthen the joint shown in Fig. 1 by means of a double-headed screw or threaded pin 41, which is threaded in the same direction at both ends, so as to have a tendency to draw the spoke members together should they become twisted.

Having thus described the invention, what is claimed is—

1. A joint comprising opposing members, one of which is pierced by an opening and the other being provided with an annular socket registering with the opening and having a concentric tenon, a tubular coupling element fitting the opening and the socket, and a headed fastening having its head engaging the outer end of the tube and its other end piercing the tenon.

2. In a wheel, the combination with a rim having an opening therethrough and a spoke having an annular socket formed in its outer end in alinement with the opening of the rim and provided with a concentric tenon, of a tubular coupling element occupying the opening in the rim and engaging the socket of the spoke, and a headed fastening passing through the coupling element with its inner end piercing the tenon and its head engaging the outer end of the tubular coupling element, the fastening being of less diameter than the coupling element.

3. A joint comprising opposing members, one of which is pierced by an opening the other being provided with an annular socket registering with the opening and having a concentric tenon, an internally and externally smooth tube snugly fitting the opening and the socket, and a screw of less diameter than the tube with its inner end driven into the tenon and its head engaging the outer end of the tube.

4. A joint comprising opposing members, one of the members being pierced by an opening and the other member having an annular socket registered with the opening and provided with a concentric tenon, a cap embracing the socketed member and carrying a tube which pierces the outer end of the cap and fits the socket and the opening, and a headed fastening extending through the tube with its inner end driven into the tenon and its head engaging the outer end of the tube.

5. A joint comprising opposing members, one of the members being pierced by an opening and the other member having an annular socket registered with the opening and provided with a concentric tenon, a split tube snugly fitting the opening and the socket with its split portion at the outer end of the tube, and a fastening driven into the tenon and provided with a head fitting within the split end of the tube and spreading the same.

6. A joint comprising opposing members, one of the members being pierced by an opening and the other member having an annular socket provided with a concentric tenon, a tube snugly fitting the opening and having an enlargement snugly fitting the socket, and a headed fastening driven into the tenon with its head engaging the outer end of the tube.

In testimony that I claim the foregoing as my own I have hereto affixed my signature in the presence of two witnesses.

ARTHUR N. WEBB.

Witnesses:
 WM. H. SHORTT,
 E. L. MORRIS.